United States Patent
Saad et al.

(10) Patent No.: US 11,639,406 B2
(45) Date of Patent: May 2, 2023

(54) ACRYLIC RESIN WITH INTERNAL PLASTICIZER

(71) Applicant: Columbia Insurance Company, Omaha, NE (US)

(72) Inventors: Rogina Saad, Ottsville, PA (US); Richard Geurtsen, Robbinsville, NJ (US); Yong Yang, Hillsborough, NJ (US); Wilbur Mardis, Franklin, TN (US)

(73) Assignee: Columbia Insurance Company, Omaha, NE (US)

( * ) Notice: Subject to any disclaimer, the term of this patent is extended or adjusted under 35 U.S.C. 154(b) by 0 days.

(21) Appl. No.: 17/052,628

(22) PCT Filed: May 21, 2019

(86) PCT No.: PCT/US2019/033310
§ 371 (c)(1),
(2) Date: Nov. 3, 2020

(87) PCT Pub. No.: WO2020/142111
PCT Pub. Date: Jul. 9, 2020

(65) Prior Publication Data
US 2021/0238325 A1    Aug. 5, 2021

Related U.S. Application Data

(60) Provisional application No. 62/788,267, filed on Jan. 4, 2019.

(51) Int. Cl.
| | | |
|---|---|---|
| *C08F 220/06* | (2006.01) | |
| *C08F 2/26* | (2006.01) | |
| *C08F 220/14* | (2006.01) | |
| *C09D 133/04* | (2006.01) | |
| *C08K 5/353* | (2006.01) | |
| *C08F 220/18* | (2006.01) | |
| *C08L 51/00* | (2006.01) | |

(52) U.S. Cl.
CPC ............. *C08F 220/06* (2013.01); *C08F 2/26* (2013.01); *C08F 220/14* (2013.01); *C08F 220/1804* (2020.02); *C08F 220/1808* (2020.02); *C08K 5/353* (2013.01); *C08L 51/003* (2013.01); *C09D 133/04* (2013.01); *C08L 2201/52* (2013.01)

(58) Field of Classification Search
CPC ............. C08F 220/06; C08F 220/1804; C08F 220/1808; C08F 2/26; C08F 220/14; C09D 133/04; C08K 5/353; C08L 51/003; C08L 2201/52
USPC .......................................................... 524/95
See application file for complete search history.

(56) References Cited

U.S. PATENT DOCUMENTS

| | | | |
|---|---|---|---|
| 3,025,252 A | | 3/1962 | Jack et al. |
| 4,460,029 A | | 7/1984 | Schuetz et al. |
| 4,508,869 A | | 4/1985 | Keskey et al. |
| 4,764,587 A | | 8/1988 | Sano et al. |
| 5,091,100 A | | 2/1992 | Trivett |
| 5,470,906 A | | 11/1995 | Craun et al. |
| 5,629,396 A | * | 5/1997 | Rice ................... C08G 73/0233 526/260 |
| 9,403,999 B2 | | 8/2016 | Bhide et al. |
| 9,873,802 B2 | | 1/2018 | Bhide et al. |
| 2008/0029388 A1 | | 11/2008 | Morimoto et al. |
| 2015/0027499 A1 | | 10/2015 | Bhide et al. |

FOREIGN PATENT DOCUMENTS

| | | | |
|---|---|---|---|
| JP | 2006096831 A | * | 4/2006 |
| JP | 2006096831 A | | 4/2006 |

OTHER PUBLICATIONS

International Search Report and Written Opinion issued in connection with the corresponding International Application No. PCT/US2019/033310 dated Oct. 17, 2019.
H. A. A. Rasoul et al. "Modified Low Molecular Weight Acrylics in Coating Application: Synthesis and Property Evaluation." J. Coat. Technol. Res., 5 (1) 113-115. FSCT and OCCA 2008.
Y Berry-Wa;lker. "Use of a fatty acid oxazoline derivative as a reactive diluent." Surface Coatings International Part B: Coatings Transactions. vol. 88, B4. 231-316. Wisconsin, US. Dec. 2005.

* cited by examiner

*Primary Examiner* — Kelechi C Egwim
(74) *Attorney, Agent, or Firm* — The H.T. Than Law Group

(57) ABSTRACT

Disclosed herein is an aqueous latex composition comprising latex particles dispersed in an aqueous solution, wherein the latex particles are polymerized from at least one acrylic monomer in a substantially solvent-free, waterborne environment, and a 2-oxazoline compound is incorporated onto the latex particles. The 2-oxazoline compound has the following structure:

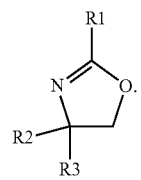

The 2-oxazoline compound is present from about 1 wt. % to about 5 wt. %. The 2-oxazoline may be grafted onto the latex particles. R1 moiety may be free of an acyclic organic radical having addition polymerizable unsaturation moiety. The aqueous latex composition may also comprises an acid monomer.

25 Claims, 1 Drawing Sheet

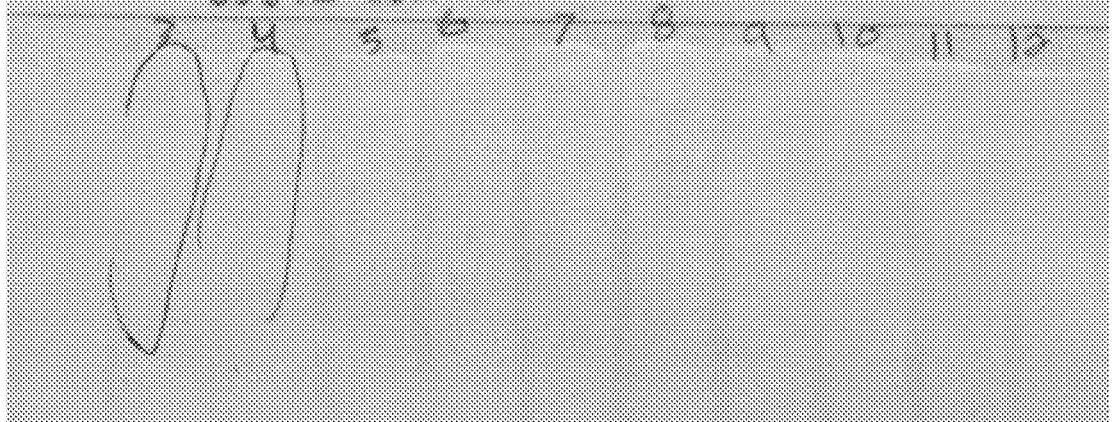
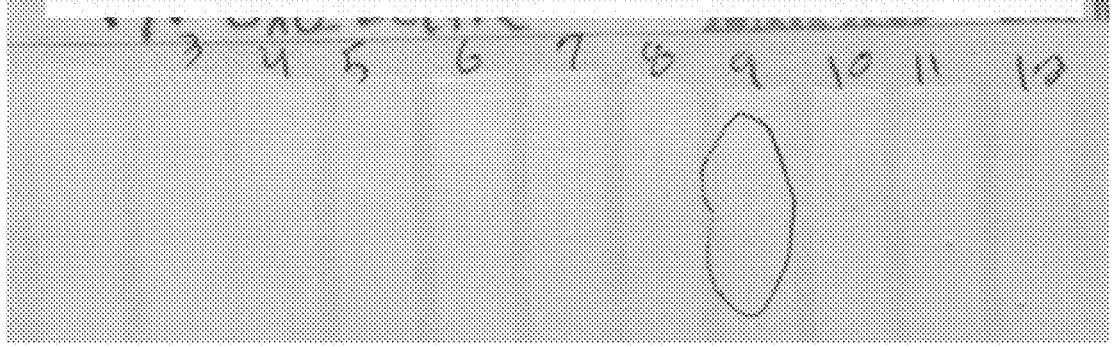
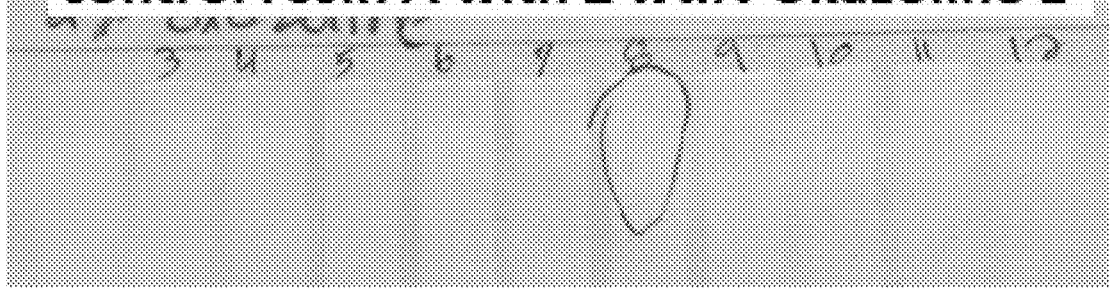

ACRYLIC RESIN WITH INTERNAL PLASTICIZER

FIELD OF THE INVENTION

The present invention relates to acrylic latex resins in aqueous paint compositions that produce paint films with improved mechanical strength and stain resistance. The latex resins also have an internal plasticizer that soften the latex particles.

BACKGROUND OF THE INVENTION

The properties of a waterborne, zero- or low VOC acrylic paint film, such as scrubbability or the ability to resist scrubbing, can be improved by a cross-linking mechanism. A known cross-linking mechanism is to copolymerize diacetone acrylamide (DAAM) monomer with the acrylic monomers and to include adipic acid dihydrazide (ADH) in the aqueous phase of the paint composition. After the aqueous paint composition is applied to substrates, the DAAM moieties cross-link with each other through the ADH, as discussed in commonly owned U.S. Pat. No. 9,115,265, which is incorporated herein by reference in its entirety.

Prerequisites of this cross-linking mechanism are its compatibility with the acrylic resin's chemistry and the absence of adverse effects on the properties of the aqueous paint compositions and the paint films. It has been shown that the DAAM and ADH can have adverse effects on the stain resistance of the paint film.

Oxazolines are five-sided-rings with a nitrogen, an oxygen and three carbon atoms at the corners, and have been known for many years (see e.g. R. Andreasch, "Zur Kenntniss des Allylharnstoffs", *Monatsh. Chem.* 1884, 5(1), pp. 33-46). U.S. Pat. No. 3,025,252 describes a plurality of species of 2-oxazoline compounds sold under the tradenames such as Alkaterge C and Alkaterge T. U.S. Pat. No. 5,091,100 discloses in Example 1 an oleyl oxazoline sold as Alkaterge E and used as a corrosion inhibitor. U.S. Pat. No. 9,403,999 teaches adding oxazoline compounds to paint compositions after the polymerization of the latex resins is completed or after the paint compositions are admixed, as an open time extending agent.

H. A. A. Rasoul et al., "Modified Low Molecular Weight Acrylics in Coating Application: Synthesis and Property Evaluation," J. Coat. Technol. Res., 2008, 5(1) 113-115, discusses the non-aqueous high temperature reaction at 175° C. of an acrylic copolymer with an alkenyl oxazoline. U.S. Pat. No. 4,764,587 teaches using bis(2-oxazoline) in a non-aqueous or solvent environment at high temperature to crosslink resins.

U.S. patent application no. US2008/0293885 discloses a polymerization of an "additionally polymerizable oxazoline (a)" with at least one type of "other monomer (b)." An "additionally polymerizable oxazoline (a)" is defined as having a substituent moiety R attached to the carbon atom between the nitrogen and oxygen atoms wherein R represents "an acyclic group having an additionally polymerizable unsaturated bond." The "other monomer (b) . . . does not react with an oxazoline group but can copolymerize with the "additionally polymerizable oxazoline." This reference thus teaches an oxazoline compound that has a reactive moiety R that copolymerizes with other monomers through an addition polymerization process. An example of the "additionally polymerizable oxazoline" is 2-isopropenyl-2-oxazoline, which has the following structure.

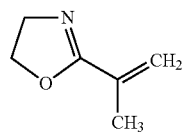

U.S. Pat. No. 4,460,029 also discloses the reactive 2-isopropenyl-2-oxazoline as an "addition polymerizable oxazoline monomer" having a similarly positioned substituent moiety, which is "an acyclic organic radical having addition polymerizable unsaturation." These additionally polymerizable oxazoline compounds are used to improve adhesion to a substrate, e.g., to promote adhesion between tire cords and tire rubbers. U.S. Pat. No. 4,508,869 discloses the same "addition polymerizable oxazoline compound" copolymerized with other monomers to improve curing or self-curing of polymeric latexes for use in films, coatings, adhesives, binders for nonwoven fabrics and the like.

As taught in U.S. Pat. Nos. 4,460,029 and 4,508,869 and U.S. patent application no. US2008/0293885, 2-isopropenyl-2-oxazoline compound is copolymerized in an addition or chain reaction polymerization process. Addition polymers are made by linking a reactive moiety of the monomers without the co-generation of other products. In other words, addition polymers are formed by the sequential addition of monomer units to an active site in a chain reaction, e.g., addition to the isopropenyl substituent moiety of 2-isopropenyl-2-oxazoline and specifically to the double carbon bond, C=C, on the isopropenyl substituent moiety. Oxazoline compounds with this acyclic organic radical having addition polymerizable unsaturation are oxazolines with a highly reactive substituent moiety.

Hence, there remains a need to improve the paint film's properties with or without cross-linking and a need to better utilize oxazoline compounds to improve the integrity of paint films.

As used herein, all percentages are weight percentage, unless indicated otherwise. Room temperature (RT) is 25° C. or 77° F.

BRIEF DESCRIPTION OF THE DRAWINGS

In the accompanying drawings, which form a part of the specification and are to be read in conjunction therewith:

FIG. 1 is a photograph of the tackiness, blocking and low temperature (LTC) coalescence tests at 45° F. or 7.2° C. for 3-12 mil drawdowns with semi-gloss paints prepared from control resin A and with 1 wt. % and 2 wt. % oxazoline #1.

SUMMARY OF THE INVENTION

One aspect of the present invention relates to an aqueous latex composition comprising latex particles dispersed in an aqueous solution, wherein the latex particles are polymerized from at least one acrylic monomer in a substantially solvent-free, waterborne environment. A 2-oxazoline compound is incorporated onto the latex particles by a chemical bond, and has the following structure:

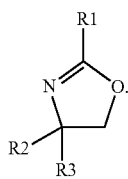

Preferably, the 2-oxazoline compound is present from about 1 wt. % to about 5 wt. %, and the at least one acrylic monomer comprises at least one of a butyl acrylate monomer, a methyl methacrylate monomer, 2-ethylhexyl acrylate or methacrylic acid.

In one embodiment the 2-oxazoline compound is grafted to the latex particles.

Another aspect of the present invention is directed to an aqueous latex composition comprising latex particles dispersed in an aqueous solution, wherein the latex particles are polymerized from at least one acrylic monomer in a substantially solvent-free, waterborne environment. A 2-oxazoline compound is incorporated onto the latex particles, and has the following structure:

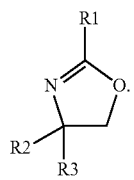

Preferably, R1 is free of an acyclic organic radical having addition polymerizable unsaturation, and preferably the 2-oxazoline compound is present from about 1 wt. % to about 5 wt. %. The at least one acrylic monomer comprises at least one of a butyl acrylate monomer, a methyl methacrylate monomer, 2-ethylhexyl acrylate and/or methacrylic acid.

Preferably, R1 is a methyl, a cis-8-heptadecenyl, an ethyl or a phenyl ring.

In one embodiment, R1=R2=R3, and the 2-oxazoline compound comprises 2,4,4-trimethyl-2-oxazoline.

In another embodiment, R2 is an ethyl and R3 is a hydroxymethyl, and the 2-oxazoline is 4-ethyl-2-(8-heptadecenyl)-2-oxazoline-4-methanol.

In another embodiment, each of R2 and R3 is a hydroxymethyl, and the the 2-oxazoline is 2-(heptadecenyl)-2-oxazoline-4,4-dimethanol.

In yet another embodiment, each of R2 and R3 is a hydrogen and the 2-oxazoline is 2-ethyl-2-oxazoline.

In another embodiment, each of R2 and R3 is a methyl and the 2-oxazoline is 4,4-dimethyl-2-phenyl-2-oxazoline.

The aqueous latex composition of the present invention may further comprise other latex particles, wherein the other latex particles are co-polymerized from a 2-oxazoline compound and at least one acrylic monomer wherein R1 of the 2-oxazoline compound is an acyclic organic radical having addition polymerizable unsaturation.

DETAILED DESCRIPTION OF THE PREFERRED EMBODIMENTS

As used herein, wt. % of oxazoline is the weight percentage of oxazoline to the total monomer or polymer solids. Wt. % of other solid components is also the weight percentage of that solid component to the total polymer weight.

As used herein, substantially free means preferably less than 5 wt. % of the total weight of the aqueous resin composition or paint composition, more preferably less than 3% and more preferably less than 1%. As used herein, a substantially solvent-free, waterborne environment does not include any coalescent aids which may or may not include solvent(s).

The present inventors have discovered a novel way to incorporate several oxazoline compounds with acrylic monomers in a waterborne environment by grafting, which includes grafting and other chemical bonds that lead to or result in improved paint film mechanical properties, such as the scrubbability of the film without harming the paint film's ability to resist stains, such as coffee, red wine, mustard, ketchup and graphite.

Oxazoline is a five-member heterocyclic chemical compound containing one oxygen and one nitrogen atom and three carbons. Compounds that containing the oxazoline ring have various uses. The properties of oxazoline compounds depend on the substituent moieties that are bonded to the ring, and more specifically to one of the carbons on the ring. Out of the three possible isomers of oxazolines (2-oxazoline, 3-oxazoline and 4-oxazoline) depending on the location of the double bond, 2-oxazoline is the most stable and common. Oxazoline, as used herein, is the stable 2-oxazoline isomer.

Suitable oxazolines usable in the present invention include but are not limited to the following structure:

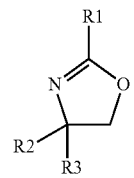

In one embodiment, R1, R2 and R3 are alkyl, preferably methyl (CH$_3$), groups (or radicals). This compound is known as 2,4,4-trimethyl-2-oxazoline (C$_6$H$_{11}$NO) (hereinafter also referred to as oxazoline #1).

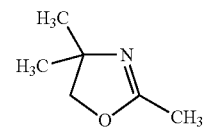

In another embodiment, R1=cis-8-heptadecenyl, R2=an ethyl (CH$_2$CH$_3$), and R3=hydroxymethyl (CH$_2$OH). This compound is known as 4-ethyl-2-(8-heptadecenyl)-2-oxazoline-4-methanol (C$_{23}$H$_{43}$NO$_2$) (hereinafter also referred to as oxazoline #2), and its structure is shown in United States published patent application No. US2015/0274993, which is incorporated herein by reference in its entirety.

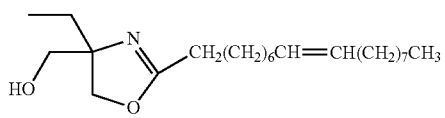

In another embodiment, R1=cis-8-heptadecenyl, and R2=R3=hydroxymethyl (CH$_2$OH). This compound is known as 2-(heptadecenyl)-2-oxazoline-4,4-dimethanol (C$_{22}$H$_{41}$NO$_3$) (hereinafter also referred to as oxazoline #3), as shown in US2015/0274993.

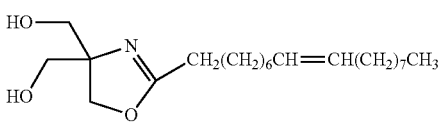

In another embodiment, R1 is an ethyl and R2 and R3 are hydrogen atoms. Oxazoline #4 is 2-ethyl-2-oxazoline ($C_5H_9NO$).

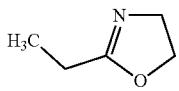

In yet another embodiment, R1 is a phenyl ring and R2 and R3 are methyl ($CH_3$). Oxazoline #5 is 4,4-dimethyl-2-phenyl-2-oxazoline ($C_{11}H_{13}NO$).

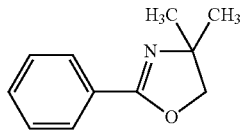

The oxazoline #2 and #3 are weak surfactants. The hydrophilic head is the 2-oxazoline ring, and the hydrophobic tail is the fatty acid tail, i.e., the heptadecenyl moiety. Due to the highly hydrophobic nature of these compounds, the present inventors have determined through experimentation that these compounds are inefficient surfactants. Oxazoline #1, #4 and #5 are not surfactants. Oxazoline #1, #2, #3, #4 and #5 do not participate as surfactants normally do in the emulsion polymerization reaction used to form the inventive latexes, as illustrated by the examples in the Appendix.

In these five oxazoline structures, position R1, i.e., the position that is bonded to the carbon atom located between the nitrogen and oxygen atoms on the oxazole ring, can be a methyl (#1), a cis-8-heptadecenyl (##2 and 3), an ethyl (#4) or a phenyl ring (#5).

The oxazoline #1, #2, #3, #4 and #5 are incorporated with one or more acrylic monomers and additives to form the inventive latex resins. While cross-linkable monomer(s) and crosslinking agent(s) can be used with the inventive latex resin, preferably the inventive latex resins are used without them.

Suitable emulsion latex particles include but are not limited to acrylic, vinyl, vinyl-acrylic or styrene-acrylic polymers or copolymers. The latex particles coalesce and/or crosslink to form a paint film on a substrate. Latexes made principally from acrylic monomers are preferred for the present invention, as illustrated in the Examples below. Exemplary, non-limiting monomers suitable to form the emulsion latex particles for the present invention are described below.

Any (meth)acrylic monomers can be used in the present invention. Suitable (meth)acrylic monomers include, but are not limited to methyl (meth)acrylate, ethyl (meth)acrylate, butyl (meth)acrylate, iso-octyl (meth)acrylate, lauryl (meth) acrylate, 2-ethylhexyl (meth)acrylate, stearyl (meth)acrylate, isobornyl (meth)acrylate, methoxyethyl (meth)acrylate, 2-ethyoxyethyl (meth)acrylate, 2-hydroxyethyl (meth)acrylate, 2-hydroxybutyl (meth)acrylate, dimethylamino ethyl (meth)acrylate, diethylaminoethyl (meth)acrylate, dimethylaminopropyl (meth)acrylamide, alkyl (meth)acrylic acids, such as methyl (meth)acrylate acids, (meth)acrylic acids, wet adhesion monomers, such as N-(2-methacryloyloxyethyl)ethylene urea, and multifunctional monomers such as divinyl benzene, diacrylates, for crosslinking functions etc., acrylic acids, ionic acrylate salts, alkacrylic acids, ionic alkacrylate salts, haloacrylic acids, ionic haloacrylate salts, acrylamides, alkacrylamides, monoalkyl acrylamides, monoalkyl alkacrylamides, alkyl acrylates, alkyl alkacrylates, acrylonitrile, alkacrylonitriles, dialkyl acrylamides, dialkyl alkacrylamides, hydroxyalkyl acrylates, hydroxyalkyl alkacrylates, only partially esterified acrylate esters of alkylene glycols, only partially esterified acrylate esters of non-polymeric polyhydroxy compounds like glycerol, only partially esterified acrylate esters of polymeric polyhydroxy compounds, itaconic acid, itaconic mono and di-esters, and combinations thereof. The preferred alkyl (meth)acrylate monomers are methyl methacrylate and butyl acrylate.

Preferred monomers containing aromatic groups are styrene and α-methylstyrene. Other suitable monomers containing aromatic groups include, but are not limited to, 2,4-diphenyl-4-methyl-1-pentene, 2,4-dimethylstyrene, 2,4,6-trimethylstyrene, 2,3,4,5,6-pentafluorostyrene, (vinylbenzyl)trimethylammonium chloride, 2,6-dichlorostyrene, 2-fluorostyrene, 2-isopropenylaniline, 3(trifluoromethyl) styrene, 3-fluorostyrene, α-methylstyrene, 3-vinylbenzoic acid, 4-vinylbenzyl chloride, α-bromostyrene, 9-vinylanthracene, and combinations thereof.

Preferred monomers containing primary amide groups are (meth)acrylamides. Suitable monomers containing amide groups include, but are not limited to, N-vinylformamide, or any vinyl amide, N,N-dimethyl(meth)acrylamide, N-(1,1-dimethyl-3-oxobutyl)(meth)acrylamide, N-(hydroxymethyl) (meth)acrylamide, N-(3-methoxypropyl)(meth)acrylamide, N-(butoxymethyl)(meth)acrylamide, N-(isobutoxymethyl) acryl(meth)acrylamide, N-[tris(hydroxymethyl)methyl] acryl(meth)acrylamide, 7-[4-(trifluoromethyl)coumarin] (meth)acrylamide, 3-(3-fluorophenyl)-2-propenamide, 3-(4-methylphenyl)(meth)acrylamide, N-(tert-butyl)(meth) acrylamide, and combinations thereof. These monomers can be polymerized with acrylic monomers, listed above. General formula for vinyl(form)amides are:

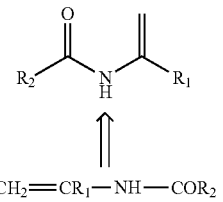

$$CH_2=CR_1-NH-COR_2$$

and (meth)acrylamides:

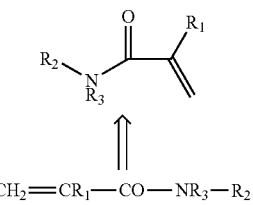

$$CH_2=CR_1-CO-NR_3-R_2$$

where R1 and R2 can be —H, —CH$_3$, —CH$_2$CH$_3$, and other substituted organic functional groups and R3 can by —H, an alkyl or an aryl.

In one embodiment, styrene monomers, such as styrene, methylstyrene, chlorostyrene, methoxystyrene and the like, are preferably co-polymerized with (meth)acrylamide monomers.

In one embodiment, the aqueous latex polymer may also comprise vinyl monomers. Monomers of this type suitable for use in accordance with the present invention include any compounds having vinyl functionality, i.e., —CH=CH$_2$ group. Preferably, the vinyl monomers are selected from the group consisting of vinyl esters, vinyl aromatic hydrocarbons, vinyl aliphatic hydrocarbons, vinyl alkyl ethers and mixtures thereof.

Suitable vinyl monomers include vinyl esters, such as, for example, vinyl acetate, vinyl propionate, vinyl laurate, vinyl pivalate, vinyl nonanoate, vinyl decanoate, vinyl neodecanoate, vinyl butyrates, vinyl caproate, vinyl benzoates, vinyl isopropyl acetates and similar vinyl esters; nitrile monomers, such (meth)acrylonitrile and the like; vinyl aromatic hydrocarbons, such as, for example, styrene, methyl styrenes and similar lower alkyl styrenes, chlorostyrene, vinyl toluene, vinyl naphthalene and divinyl benzene; vinyl aliphatic hydrocarbon monomers, such as, for example, vinyl chloride and vinylidene chloride as well as alpha olefins such as, for example, ethylene, propylene, isobutylene, as well as conjugated dienes such as 1,3-butadiene, methyl-2-butadiene, 1,3-piperylene, 2,3-dimethyl butadiene, isoprene, cyclohexene, cyclopentadiene, and dicyclopentadiene; and vinyl alkyl ethers, such as, for example, methyl vinyl ether, isopropyl vinyl ether, n-butyl vinyl ether, and isobutyl vinyl ether.

Additives including surfactants, initiators, chaser solutions, biocides, rheological modifiers, etc. can be added to the polymerization process.

Examples of surfactants useful in the polymerization process may include, but are not limited to, nonionic and/or anionic surfactants such as ammonium nonoxynol-4 sulfate, nonylphenol (10) ethoxylate, nonylphenol (~10 mol %) ethoxylate, nonylphenol (~40 mol %) ethoxylate, octylphenol (~40 mol %) ethoxylate, octylphenol (9-10) ethoxylate, sodium dodecyl sulfonate, sodium tetradecyl sulfonate, sodium hexadecyl sulfonate, polyether phosphate esters, alcohol ethoxylate phosphate esters, those compounds sold under the tradename Triton™ (e.g., QS series, CF series, X series, and the like), those compounds sold under the tradename Rhodapon™, those sold under the tradename Rhodapex™, those compounds sold under the tradename Rhodacal™, those compounds sold under the tradename Rhodafac™, and the like, and combinations thereof.

Examples of initiators and chaser solutions useful in the polymerization process may include, but are not limited to, ammonium persulfate, sodium persulfate, azo initiators such as azoisobutyronitrile, redox systems such as sodium hydroxymethanesulfinate (sodium formaldehyde sulfoxylate; reducer) and t-butyl-hydroperoxide (oxidizer), and the like, and combinations thereof, typically in an aqueous solution. Either or both of these components can optionally contain an additional surfactant and/or a pH adjuster, if desired to stabilize the emulsion.

Examples of pH adjusters useful in the polymerization process may include, but are not limited to, ammonium hydroxide, sodium hydroxide, sodium carbonate, sodium bicarbonate, potassium hydroxide, potassium carbonate, potassium bicarbonate, ammonia, amines such as trimethylamine, triethylamine, dimethylaminoethanol, diethylaminoethanol, AMP-95 and the like, and combinations thereof. In certain cases, compounds that qualify as pH adjusters can be added for purposes other than adjusting pH, e.g., emulsion stabilization, and yet are still characterized herein as pH adjusters.

Polymer molecular weight control agents are designed to control (usually to limit) the molecular weight of a propagating polymer. While polymer molecular weight control agents may include things like radiation, they are typically molecules added to the polymerization mixture. Examples of polymer molecular weight control agents include, but are not limited to, chain transfer agents (CTAs), e.g., alkyl mercapto-esters such as isooctyl mercaptopropionate, alkyl mercaptans, and the like, and combinations thereof. Chain transfer agents typically operate as polymer molecular weight control agent molecules, for example, by catalytically or consumptively terminating a propagating polymer chain in a way that also initiates a newly propagating polymer chain. In this way, the amount of chain transfer agent(s) can be tailored to reduce the target polymer molecular weight in a set polymerization system, or alternately, in combination with calculation of the amount of initiator, can be calculated to target a particular average polymer molecular weight (e.g., within a given range) of a polymerization system.

In one embodiment, acrylic latex resins are modified with the addition of oxazoline #1, #2, #3, #4 or #5, or a combination thereof in an amount from about 1 wt. % to about 5 wt. %, which is added to the monomer pre-emulsion mixture during the emulsion polymerization process. In one embodiment, the oxazoline is added to the last 20% to 25% of the monomer pre-emulsion feed (hereinafter Process I). In another embodiment, the oxazoline is added after the polymerization is complete at or about the temperature of the polymerization, i.e., within ±5° C. or ±3° C. of the polymerization temperature (hereinafter Process II). In yet another embodiment, the oxazoline is added throughout the monomer pre-emulsion feed (hereinafter Process III).

In Table 1, semi-gloss paint samples (gloss unit (GU)=35-70 units at 60°) were prepared with control paint A that includes no oxazoline. Gloss unit is described in commonly owned U.S. non-provisional patent application Ser. No. 15/844,811 entitled "Pop-up Gloss Card," which is incorporated herein in its entirety. Control A paint comprises film-forming latex binder resin A made from acrylic monomers comprising methyl methacrylate (MMA), methacrylic acid (MAA) and butyl acrylate (BA). Formulations for resin A paint samples are discussed below.

TABLE

Results or Paint Formula A with Resin A in a Semi-Gloss Latex or Emulsion Paint Finish

| No. | Process | Composition | Scrub | Coffee | Red Wine | Mustard | Ketchup | Graphite | Total |
|---|---|---|---|---|---|---|---|---|---|
| 1 | N/A | Control A | 813-1069 | 1.9 | 0.98 | 0.26 | 0.11 | 0.15 | 3.40 |
| 2 | I | Oxazoline 1 (1%) | 1068-1255 | 1.51 | 0.45 | 0.09 | 0.07 | 0.08 | 2.20 |
| 3 | II | Oxazoline 1 (1%) | 970-1693 | 1.67 | 0.91 | 0.54 | 0.1 | 0.21 | 3.43 |

TABLE-continued

Results or Paint Formula A with Resin A in a Semi-Gloss Latex or Emulsion Paint Finish

| No. | Process | Composition | Scrub | Coffee | Red Wine | Mustard | Ketchup | Graphite | Total |
|---|---|---|---|---|---|---|---|---|---|
| 4 | N/A | Control A | 893-1360 | 1.26 | 0.43 | 0.2 | 0.05 | 0.17 | 2.11 |
| 5 | II | Oxazoline 1 (1%) | 1029-1640 | 1.55 | 0.57 | 0.31 | 0.06 | 0.17 | 2.66 |
| 6 | N/A | Control A | 1060-1439 | 1.60 | 1.20 | 0.44 | 0.10 | 0.32 | 3.66 |
| 7 | II | Oxazoline 1 (1%) | 1130-1547 | 1.72 | 1.13 | 0.75 | 0.03 | 0.25 | 3.88 |
| 8 | II | Oxazoline 1 (2%) | 1277-1747 | 1.49 | 0.98 | 0.53 | 0.03 | 0.48 | 3.51 |
| 9 | N/A | Control A | 1242 | 1.56 | 1.28 | 0.26 | 0.18 | 0.17 | 3.45 |
| 10 | II | Oxazoline 1 (1%) | 1322 | 1.65 | 1.16 | 0.20 | 0.15 | 0.33 | 3.49 |
| 11 | II | Oxazoline 1 (2%) | 1465 | 1.64 | 1.07 | 0.36 | 0.13 | 0.27 | 3.47 |
| 12 | II | Oxazoline 1 (5%) | 1750 | 1.98 | 1.35 | 0.60 | 0.29 | 0.45 | 4.67 |
| 13 | I | Oxazoline 2 (1%) | 1331 | 1.77 | 1.34 | 1.61 | 0.24 | 0.11 | 5.07 |
| 14 | I | Oxazoline 3 (1%) | 1454 | 1.67 | 1.76 | 0.54 | 0.21 | 0.27 | 4.45 |

As shown in Table 1, oxazoline #1 incorporated under Process I (Example 2) and Process II (Examples 3, 5, 7-8, 10-12) from 1 wt. % to 5 wt. % shows improved scrubbability with minimum impact on the stain test for coffee, red wine, mustard, ketchup and graphite. Oxazoline #2 and #3 (Example 13 and 14) incorporated under Process I also show improved scrubbability and acceptable stain resistance. Furthermore, Examples 1-8 show that the increase in scrubbability versus the control samples is a reproducible result when the amount of oxazoline #1 remains roughly the same. Examples 9-12 show that as the amount in wt. % of oxazoline increases, the resistance to scrubbing also increases. Examples 13 and 14 show that oxazoline #2 and #3 also show improved scrubbability; however, the stain resistance while remaining acceptable is higher than that of the control.

The scrubbability number means the number of cycles of scrubbing before the paint film fails, and the higher scrubbability number means higher resistance to scrubbing. The total number in the stain test is the combination of measured stains caused by the various common substances. The lower stain number means less stains were measured and means better stain resistance. The stain resistance values reported herein are less than 6.0 for the controls and inventive samples and are within the acceptable range. Preferably, stain resistance values of less than 8.0, more preferably less than 7.0 and more preferably less than 6.0 are acceptable.

As shown in Tables 2A-B, oxazoline #1, #4 and #5 were incorporated with acrylic monomers and compared to Control A. The paint samples were finished to an eggshell finish (GU=10-25 at 60°). Other paint samples were prepared with the prior art oxazoline, 2-isopropenyl-2-oxazoline, i.e., the oxazoline with a reactive substituent moiety on R1, discussed above. In Table 3, paint samples made with oxazoline #1 and the prior art oxazoline were prepared and compared to Control A in a semigloss finish.

Tables 2A-B and 3 show that paint samples with the prior art oxazoline when processed according to Processes I and III have a scrubbability that is statistically indifferent from the controls. The present inventors note that at least Process II is not disclosed in the prior art. On the other hand, paint samples with oxazoline #1, #4 and #5 incorporated under Processes I, II and II had far better scrubbability results. This means that the prior art oxazoline when processed with acrylic resins under Processes I and III created a latex resin that shows no statistically meaningful difference in the paint film's scrubbability or scrub resistance.

The present inventors also increased the amount of wet adhesion monomer (WAM) in one example to test whether the higher adhesion may affect the scrub resistance. Example 6 in Table 2A shows that the scrubbability remains substantially the same despite the increase in WAM.

TABLE 2A

Results in Paint Formula B with Resin A in an Eggshell Finish

| No. | Process | COMPOSITION | SCRUB | Coffee | Red Wine | Mustard | Ketchup | Graphite | TOTAL |
|---|---|---|---|---|---|---|---|---|---|
| 1 | N/A | CONTROL A | 406-824 | 0.91 | 1.00 | 0.39 | 0.12 | 0.83 | 3.25 |
| 2 | I | Prior art Oxazoline (1%) | 670-842 | 0.83 | 0.83 | 0.87 | 0.08 | 0.72 | 3.33 |
| 3 | III | Prior art Oxazoline (1%) | 618-790 | 0.68 | 0.37 | 0.18 | 0.05 | 0.46 | 1.74 |
| 4 | N/A | CONTROL A | 568-706 | 0.78 | 0.47 | 0.11 | 0.07 | 0.75 | 2.18 |
| 5 | III | Prior art Oxazoline (2.4%) | 497-611 | 0.46 | 0.26 | 0.07 | 0.06 | 0.38 | 1.23 |
| 6 | N/A | Increased WAM (add't 1.4%) No oxazoline | 542-663 | 0.53 | 0.32 | 0.09 | 0.06 | 0.25 | 1.25 |
| 7 | N/A | CONTROL A | 510-619 | 1.86 | 1.62 | 1.88 | 0.18 | 0.25 | 5.79 |
| 8 | I | Oxazoline 5 (1%) | 740-832 | 0.84 | 0.47 | 1.02 | 0.02 | 0.14 | 2.49 |
| 9 | I | Oxazoline 1 (1%) | 700-916 | 0.72 | 0.38 | 0.51 | 0.04 | 0.05 | 1.70 |
| 10 | II | Oxazoline 1 (1%) | 660-1220 | 0.84 | 0.54 | 0.44 | 0.10 | 0.45 | 2.37 |
| 11 | I | Oxazoline 4 (1%) | 650-878 | 0.77 | 0.28 | 0.90 | 0.10 | 0.16 | 2.21 |
| 12 | I | Oxazoline 5 (3.6%) | 681-811 | 0.53 | 0.44 | 0.93 | 0.04 | 0.20 | 2.14 |
| 13 | I | Oxazoline 4 (1%) | 762-980 | 1.07 | 0.84 | 3.29 | 0.16 | 0.40 | 5.76 |

TABLE 2B

Results for Paint Formula B with Resin A in Eggshell Finish

| No. | Process | Composition | Scrub | Coffee | Red Wine | Mustard | Ketchup | Graphite | Total |
|---|---|---|---|---|---|---|---|---|---|
| 1 | N/A | Control A | 510-619 | 1.86 | 1.62 | 1.88 | 0.18 | 0.25 | 5.79 |
| 2 | I | Oxazoline 1 (1%) | 700-916 | 0.72 | 0.38 | 0.51 | 0.04 | 0.05 | 1.70 |
| 3 | N/A | Control A | 492-627 | 1.15 | 1.02 | 0.63 | 0.11 | 0.23 | 3.14 |
| 4 | I | Oxazoline 1 (1%) | 662-861 | 0.64 | 0.26 | 0.39 | 0.08 | 0.29 | 1.66 |
| 5 | N/A | Control A | 544-739 | 1.08 | 0.85 | 0.17 | 0.14 | 0.52 | 2.76 |
| 6 | II | Oxazoline 1 (1%) | 660-1220 | 0.84 | 0.54 | 0.44 | 0.10 | 0.45 | 2.37 |

TABLE 3

Results in Paint Formula A with Resin A in a Semi-Gloss Finish

| No. | Process | COMPOSITION | SCRUB | Coffee | Red Wine | Mustard | Ketchup | Graphite | TOTAL |
|---|---|---|---|---|---|---|---|---|---|
| 1 | N/A | CONTROL A | 813-1069 | 1.9 | 0.98 | 0.26 | 0.11 | 0.15 | 3.40 |
| 2 | I | Oxazoline 1 (1%) | 1068-1255 | 1.51 | 0.45 | 0.09 | 0.07 | 0.08 | 2.20 |
| 3 | II | Oxazoline 1 (1%) | 970-1693 | 1.67 | 0.91 | 0.54 | 0.1 | 0.21 | 3.43 |
| 4 | II | Oxazoline 1 (2%) | 1277-1747 | 1.49 | 0.98 | 0.53 | 0.03 | 0.48 | 3.51 |
| 5 | I | Prior art Oxazoline (1%) | 888-1187 | 1.40 | 0.81 | 0.24 | 0.09 | 0.21 | 2.75 |
| 6 | III | Prior art Oxazoline (1%) | 802-1098 | 1.47 | 1.04 | 0.53 | 0.12 | 0.2 | 3.36 |

As shown in Table 4, oxazoline #2 and #3 are incorporated with acrylic resins under Process III. Control B is another acrylic latex resin comprising MMA, MAA and 2-ethylhexyl mathacrylate (2-EHA), which affects a semi-gloss finish in paint formula B. The results also show that scrub resistance has increased while stain resistance remains acceptable. The stain test presented in Table 4 also includes a ttp stain, which comprises raw umber, white petroleum jelly and mineral spirits, and a litter stain, which comprises lanolin, petroleum jelly, carbon black and mineral oil.

TABLE 4

Results for Paint Formula B with Resin B with Semi-Gloss Finish

| | | | | | | | | | | Stain | |
|---|---|---|---|---|---|---|---|---|---|---|---|
| No. | Process | Composition | Scrub | Coffee | Red Wine | Mustard | Ketchup | Graphite | Total | Ttp | Litter |
| 1 | N/A | Control B | 673 | 0.58 | 1.65 | 0.57 | 0.38 | 0.17 | 3.35 | 0.25 | 0.61 |
| 2 | III | Oxazoline 2 (1%) | 1012 | 0.91 | 2.25 | 1.31 | 0.29 | 0.10 | 4.86 | 0.31 | 0.78 |
| 3 | N/A | Control B | 673 | 0.81 | 2.47 | 0.33 | 0.18 | 0.12 | 3.91 | 0.55 | 0.32 |
| 4 | III | Oxazoline 3 (1%) | 824 | 0.89 | 3.30 | 0.59 | 0.07 | 0.10 | 4.95 | 0.38 | 0.36 |
| 5 | N/A | Control B | 579 | 0.16 | 0.26 | 0.23 | 0.08 | 0.04 | 0.77 | 0.76 | 0.63 |
| 6 | III | Oxazoline 2 (1%) | 777 | 0.10 | 0.10 | 0.35 | 0.26 | 0.18 | 0.99 | 0.79 | 0.28 |

The present inventors investigated whether the improved scrubbability was caused by the formation of an alkanolamide that could have been produced through the hydrolysis of the oxazoline compounds. Furthermore, oxazoline #2 and #3 could be a possible source of oleic acid, which could have acted as a plasticizer. To determine whether the presence of either of these products could have an effect on scrubbability performance, control B paints in semi-gloss finish, and control B paints, which contained respectively, an oxazoline #2 added post-polymerization at RT, hydrolyzed oxazoline #2 added post-polymerization at RT, and an oleic acid added post-polymerization at RT, were compared to a paint sample B with oxazoline #2 incorporated under Process I.

TABLE 5

Results for Paint Formula B with Resin B in Semi-Gloss Finish with Inventive versus Comparative Examples

| No. | Process | Composition | Scrub | Coffee | Red Wine | Mustard | Ketchup | Graphite | Total |
|---|---|---|---|---|---|---|---|---|---|
| 1 | N/A | Control B | 579 | 0.91 | 3.17 | 0.60 | 0.20 | 0.07 | 4.95 |
| 2 | N/A | Oxazoline 2 (1%) added to paint at RT | 584 | 0.72 | 1.88 | 0.28 | 0.17 | 0.13 | 3.18 |
| 3 | N/A | Hydrolyzed Oxazoline 2 (1%) added to paint at RT | 549 | 0.74 | 1.48 | 0.30 | 0.12 | 0.03 | 2.67 |
| 4 | N/A | Oleic acid (1%) added to paint at RT | 690 | 0.54 | 1.67 | 0.21 | 0.08 | 0.08 | 2.58 |
| 5 | I | Oxazoline 2 (1%) incorporated latex | 748 | 0.63 | 1.65 | 0.12 | 0.06 | 0.05 | 2.51 |

The results show that the oxazoline #2 incorporated under Process I exhibits about 170 cycles of scrub higher than the control. Oxazoline #2 added post-polymerization at RT exhibits the same scrubbability as the control. Hydrolyzed oxazoline #2 added post-polymerization to paint at RT actually reduces the scrubbability. Oleic acid when added to paint shows significantly different scrubbability than hydrolyzed oxazoline, thereby demonstrating that oleic acid does affect scrubbability, but not to the same extent as oxazoline #2. It is further to be expected that the level of oleic acid present after the incorporation of oxazoline #2 under Process I is not enough to produce a substantial increase in scrubbability.

The experimental results from Table 5 confirm the experimental results from Tables 2A, 2B and 3, supra., that oxazoline #1-#5 incorporated with acrylic monomers to form structurally unique latex polymers that increase the scrub resistance of the paint films. This suggests that film formation with such latex polymers proceeds better than with acrylic latex polymers without the oxazoline #1-#5 incorporation. Importantly, the prior art oxazoline with "an acyclic organic radical having addition polymerizable unsaturation," such as 2-isopropenyl-2-oxazoline does not produce the inventive latex polymers, as evidenced by its inability to improve the film's scrub resistance.

The present inventors also note that while 2-isopropenyl-2-oxazoline (i.e., a 2-oxazoline with an acyclic organic radical having addition polymerizable unsaturation substituent moiety) does not improve the film's scrub resistance, it does not harm the film's scrub resistance, and in some examples actually appears to improve the paint film's stain resistance in some examples. Hence, it is possible for the paint composition to contain latex particles polymerized from acrylic monomers and 2-oxazoline with an acyclic organic radical having addition polymerizable unsaturation, in addition to the inventive acrylic latex particles incorporated with oxazoline #1, #2, #3, #4 or #5.

The present inventors further investigated in Table 6 the effects of oxazolines, more particularly oxazoline #1, on the properties of paint films other than scrubbability and stain resistance. An acrylic resin control A, modified with Oxazoline #1 using Process II at 1 wt. % and 2 wt. % were admixed with an opacifying grind to make tintable paints. The tackiness, blocking and low temperature (LTC) coalescence tests were conducted for the paint films and the residual oxazoline amount, minimum film forming temperature and glass transition temperature were measured for the resin.

A CT3 texture analyzer manufactured by Brookfield Engineering was used for tack analysis. The number reported is the average adhesive force in grams (force/weight). The lower the number, the less tacky the coating; the higher the number, the more tacky the coating. When comparing paints, lower tack number indicates better paint film's performance in tack resistance. Generally, tackiness increases when more coalescing agent is added to the paint. This phenomenon (increase of tackiness) was noticed with the incorporation of oxazoline. Since the main difference between control and experimental was the addition of oxazoline compounds which resulted in higher tackiness value.

This observation therefore further pointed to the conclusion that oxazoline is acting as an internal plasticizer.

In the LTC test, paint is applied at various thicknesses, e.g., from 3 mils to 12 mils (1 mil=1/1000 inch). The thickness at which the paint film cracks is the failure point. The LTC is the highest thickness in mils that a paint film without cracks is obtained. The higher the LTC the better the coalescence, and the least amount of external plasticizer or coalescing agent is needed for film formation. LTC is used to determine the comparative coalescence of a series of latex paints by noticing how samples are dried at standard and low temperatures. Coalescence is the formation of a film of resinous or polymeric material when water evaporates from an emulsion or latex system, permitting contact and fusion of adjacent latex particles. Thus, this test evaluates the paint film formation under standard and low temperature. Cracking indicates a poor film formation. Alternatively, the LTC test may be conducted in accordance to ASTM D3793.

TABLE 6

Results for Paint Formula A with Resin A in Semi-Gloss Finish

| Modification | paint | | LTC | resin | | |
|---|---|---|---|---|---|---|
| with Oxazoline compound 1 (wt. %) | Tack | Blocking | (45° C.) fail at (mils) | Oxazoline Residue (ppm) | MFFT (° C.) | Tg (° C.) |
| 0 | 108 | 80% | 4 | 0 | 13.9 | 24.7 |
| 1 | 160 | 90% | 9 | 106 | 13.6 | 22.6 |
| 2 | 199 | 100% | 8 | 301 | 13.7 | 21.3 |

As shown in Table 6, oxazoline contributes to additional tackiness of the paint film, and the transfer of paint film to another substrate. The LTC test which is shown in FIG. 1 shows that the paint film can be as thick as 8 or 9 mils before the paint film fails. This means that the paint films can coalesce without additional external plasticizer or coalescent agent(s), and cross-linking of the latex particles is not necessary.

Table 6 also shows that the residual oxazoline in the resin is at very low levels. The residual oxazoline is determined by the gas chromatography-mass spectrometry (GC-MS) method, described further below, on the finished aqueous latex composition after emulsion polymerization. This means that most of the oxazolines were reacted into the latex particles. The minimum film forming temperature remains substantially unchanged; however, the glass transition temperature, as measured by differential scanning calorimetry (DSC) decreases slightly. The glass transition temperature shows a decrease with the introduction of oxazoline #1 and with the increase of oxazoline #1. This means that the oxazoline acts as an internal plasticizer by making the paint films softer, more flexible, as shown in the scrubbability tests.

These experimental results show that oxazoline nos. 1-5 were incorporated into the monomer mixtures in three different ways: (i) during the last 20-25% of the polymerization, (ii) at the end of the polymerization at substantially a polymerization temperature and (iii) throughout the polymerization process. The results show that with oxazoline nos. 1-5 incorporated therein the scrub resistance increased and stain resistance remained acceptable or substantially unchanged. This shows that oxazoline nos. 1-5 were incorporated to the acrylic latexes substantially in the same manner. In Process II, the acrylic latexes were already formed or already polymerized before the oxazolines according to the present invention were added. Moreover, the residual amount of oxazoline after being incorporated to the acrylic latexes is quite low. In the example shown in Table 6, at 1 wt. % or 10,000 ppm only 106 ppm remain unattached and at 2 wt. % or 20,000 ppm only 301 ppm remain unattached. This shows that significant amounts of the oxazoline according to the present invention were incorporated. Furthermore, when an oxazoline according to the present invention is added post-polymerization at RT, it did not change the scrub resistance of the acrylic latex suggesting that adding post-polymerization at RT did not incorporate the oxazoline to the acrylic latex.

Without being bound to any particular theory, the present inventors believe that the oxazolines according to the present invention were not co-polymerized with acrylic monomers to form the acrylic latexes but were incorporated or chemically attached to the acrylic latexes. The present inventors believe that the oxazolines according to the present invention were grafted or otherwise chemically bonded to reactive sites on the acrylic latexes. On the other hand, the prior art oxazoline as taught in US2008/0293885 discussed above copolymerized with acrylic monomers, and as shown in the experiments above does not improve scrub resistance.

Without being bound to any particular theory, the present inventors believe that under the processes described herein the oxazoline compounds according to the present invention react onto the resin. The present inventors believe that this reaction occurred through the functionality of the oxazoline ring instead of the addition polymerizable double bond moiety disclosed in the prior art.

Without being bound to any particular theory, the present inventors believe that under the aqueous emulsion conditions applied, a significant part of the oxazoline compounds react onto the resin, thereby providing self-coalescing properties to said resin. This is further supported by the following data. The oxazoline #1 was incorporated according to Process III.

TABLE 7

Residual/Unreacted Oxazoline and Effects on Tg

| Wt % | Amt. of Recovered Oxazoline #1 (area count) | Tg unwashed ° C. | Tg washed ° C. | MFFT ° C. |
|---|---|---|---|---|
| 0% MAA; 1% oxazoline #1 | 91228143 | 19.1 | | |
| 5% MAA | | 39.2 | 40.4 | |
| 5% MAA; 1% oxazoline #1 | 25954951 | 27.4 | 30 | 22.1 |
| 5% MAA; 5% oxazoline #1 | 128203724 | 16 | 30 | 19 |

The amounts of oxazoline represent the residual hydrolyzed oxazoline using the GC-MS method. Gas chromatography-mass spectrometry (GC-MS) is an analytical method that combines features of gas-chromatography and mass spectrometry to identify different substances within a test sample. GC-MS allows the detection of very small amount of a substance. The glass transition temperatures (Tg) are measured by the differential scanning calorimeter (DSC) technique. "Washed" means that the latex resin particles are washed from dried film samples with methanol and then rinsed with deionized water to remove unattached hydrolyzed oxazoline.

The amounts of oxazoline reported in Table 7 represent the recovery of hydrolyzed oxazoline. In this experiment, oxazoline hydrolyzed readily and there is virtually no intact oxazoline remained. The amounts of oxazoline reported are dimensionless and are based on peak surface area. As discussed above, the wt. % of oxazoline and MAA are based on total polymer solids. Table 7 shows that at 1 wt. % of oxazoline the amount of residual or unreacted hydrolyzed oxazoline is significantly higher in the absence of methacrylic acid (MAA) monomer. This suggests that the oxazoline is reacted at least with at least one acid monomer, such as MAA. When the oxazoline amount was increased by five-folds while the amount of MAA remained the same, the amount of residual hydrolyzed oxazoline increases roughly five-folds. This suggests a corresponding ratio between oxazoline and the acid monomer.

Suitable acid monomers include but are not limited to monocarboxylic or polycarboxylic, containing from about 3 to about 8 carbon atoms. Non-limiting examples of suitable monomers include acrylic acid, methacrylic acid, ethacrylic acid, β, β-dimethylacrylic acid, crotonic acid, 2-pentenoic acid, 2-hexenoic acid, maleic acid, fumaric acid, citraconic acid, mesaconic acid, itaconic acid, 3-butene-1,2,3-tricarboxylic acid, and the like.

The Tg of the resin with 5% MAA is about the same with the washed and unwashed sample (about 40° C.). When 1% oxazoline is incorporated, the Tg of the unwashed resin dropped about 10° C. The small difference between the Tg for the washed resin and the unwashed resin, suggests that the amount and effect of residual hydrolyzed oxazoline is relatively small. When 5% oxazoline is incorporated, the Tg of the unwashed resin dropped further; however, after washing the Tg returned to substantially the same level as the resin with 1% oxazoline. This suggests that the additional reaction between oxazoline and MAA did not have a significant impact on Tg. The difference between the minimum film forming temperatures (MFFT) between resins with 1% and 5% oxazoline is also small (~3° C.).

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

APPENDIX

Examples 1-14 in Table 1 discussed above are described below. The examples in the other Tables are polymerized by emulsion in a similar manner. The particle size (PS) reported herein are mean volume average, and the glass transition temperatures (Tg) are calculated according to the Fox equation. As used herein, the polymers of the invention were prepared by emulsion polymerization through single-stage or multiple-stage monomer feeds. The following abbreviations shall mean.

S1: APE-free, anionic sulfonate surfactant (40% solids),
S2: APE-free, anionic phosphate surfactant (25% solids),
S3: anionic sulfonate surfactant (23% solids),
S4: anionic phosphate surfactant (80% solids),
WAM: wet adhesion monomer (50% solids)
MAA: methacrylic acid
MMA: methyl methacrylate
BA: butyl acrylate
TBH: t-butyl hydroperoxide
FF6M: formaldehyde-free reducing agent
Oxazoline #1: 2,4,4-trimethyl-2-oxazoline ($C_6H_{11}NO$)
Oxazoline #2: 4-ethyl-2-(8-heptadecenyl)-2-oxazoline-4-methanol ($C_{23}H_{43}NO_2$)
Oxazoline #3: 2-(heptadecenyl)-2-oxazoline-4,4-dimethanol ($C_{22}H_{41}O_3$)
Oxazoline #4: 4.4-dimethyl-2-phenyl-2-oxazoline
Oxazoline #5: 2-ethyl-2-oxazoline Comparative Example 1

Emulsion polymer made with acrylic monomers (1-stage) to be used as Control A.

| Ingredient | Weight (g) | Procedure |
|---|---|---|
| Reactor Seeding | | |
| $H_2O$ | 507 | Under $N_2$ purge, add water, Surfactant 1 |
| $NaHCO_3$ | 1 | (S1) and buffer agent ($NaHCO_3$) to |
| S1 | 2 | reactor, increase temperature to 75° C. |
| Monomer Emulsion (ME) | | |
| $H_2O$ | 415 | Pre-prepare Monomer Emulsion (ME) |
| S1 | 14 | Add 5% (wt.) of ME to reactor |
| S2 | 46 | Charge seed and Initiator solution I to |
| WAM | 26 | reactor and hold for 15 minutes |
| MAA | 13 | Feed the remaining monomer emulsion |
| MMA | 593 | and Initiator Solution II simultaneously |
| BA | 522 | over a period of 3.5 hours |
| $NH_4OH$ | 6 | |
| | | After monomer feed, hold reactor at 75° C. for 1 hour |
| | | Cool the reactor to 60° C. |
| | | Feed oxidizing and reducing agent solution simultaneously over 30 min. |
| | | Cool to room temperature (RT), neutralize using $NH_4OH$ solution. |
| Initiator solution I | | |
| $H_2O$ | 15 | |
| $Na_2S_3O_8$ | 2 | Sodium persulfate |
| Initiator solution II | | |
| $Na_2S_3O_8$ | 1 | Sodium persulfate |
| $H_2O$ | 20 | |
| $H_2O$ (rinse) | 30 | |
| Oxidizing agent Solution | | |
| TBH | 2 | |
| H2O | 20 | |
| Reducing agent solution | | |
| FF6M | 2 | |
| H2O | 20 | |
| $NH_4OH$ | 2 | |
| $H_2O$ | 10 | |

The polymer has a Fox $T_g$ of 11° C., PS = 139 nm and solids content 51.2%.

Example 2

Emulsion polymer made with acrylic monomers, and (0.2-2%) of oxazoline #1 added towards the last part of feed (20-25%). PROCESS I

| Ingredient | Weight (g) | Procedure |
|---|---|---|
| Reactor Seeding | | |
| $H_2O$ | 507 | Under $N_2$ purge, add water and |
| $NaHCO_3$ | 1 | Surfactant 1 (S1) and buffer agent |
| S1 | 2 | ($NaHCO_3$) to reactor, increase temperature to 75° C. |

| Ingredient | Weight (g) | Procedure |
|---|---|---|
| Monomer Emulsion (ME) | | |
| H$_2$O | 415 | Pre-prepare Monomer Emulsion (ME) |
| S1 | 14 | Add 5% (wt.) of ME to reactor |
| S2 | 46 | Charge seed and Initiator solution I to |
| WAM | 26 | reactor and hold for 15 minutes |
| MAA | 13 | Feed the remaining monomer emulsion |
| MMA | 593 | and Initiator Solution II simultaneously |
| BA | 522 | over a period of 3.5 hours |
| NH$_4$OH | 6 | Add oxazoline #1 to last 20-25% of ME feed; Continue feed of monomers. |
| Shell ME | | After monomer feed, hold reactor at 75° C. for 1 hour |
| | | Cool the reactor to 60° C. |
| oxazoline #1 | 2.4-24 | Feed oxidizing and reducing agent solution simultaneously over 30 min. Cool to RT, neutralize using NH$_4$OH solution. |
| Initiator solution I | | |
| H$_2$O | 15 | |
| Na$_2$S$_3$O$_8$ | 2 | |
| Initiator solution II | | |
| Na$_2$S$_3$O$_8$ | 1 | |
| H$_2$O | 20 | |
| H$_2$O (rinse) | 30 | |
| Oxidizing agent Solution | | |
| TBH | 2 | |
| H2O | 20 | |
| Reducing agent solution | | |
| FF6M | 2 | |
| H2O | 20 | |
| NH$_4$OH | 2 | |
| H$_2$0 | 10 | |

Example 3

Similar polymer composition as Example 2, except that oxazoline #1 (0.2-2%) was post-added to resin at 75° C. PROCESS II

| Ingredient | Weight (g) | Procedure |
|---|---|---|
| Reactor Seeding | | |
| H$_2$O | 507 | Under N$_2$ purge, add water and |
| NaHCO$_3$ | 1 | Surfactant 1 (S1) and buffer agent |
| S1 | 2 | (NaHCO$_3$) to reactor, increase temperature to 75° C. |
| Monomer Emulsion (ME) | | |
| H2O | 415 | Pre-prepare Monomer Emulsion (ME) |
| S1 | 14 | Add 5% (wt.) of ME to reactor |
| S2 | 46 | Charge seed and initiator solution I to |
| WAM | 26 | reactor and hold for 15 minutes |
| MAA | 13 | Feed the remaining monomer emulsion |
| MMA | 593 | and Initiator Solution II simultaneously |
| BA | 522 | over a period of 3.5 hours |
| NH$_4$OH | 6 | |
| | | After monomer feed, hold reactor at 75° C. for 1 hour |
| | | Cool the reactor to 60° C. |
| | | Feed oxidizing and reducing agent solution simultaneously over 30 min. |
| | | Cool to RT, neutralize using NH$_4$OH solution. |
| Initiator solution I | | |
| H$_2$O | 15 | |
| Na$_2$S$_3$O$_8$ | 2 | |
| Initiator solution II | | |
| Na$_2$S$_3$O$_8$ | 1 | |
| H$_2$O | 20 | |
| H$_2$O (rinse) | 30 | |
| Oxidizing agent Solution | | |
| TBH | 2 | |
| H2O | 20 | |
| Reducing agent solution | | |
| FF6M | 2 | |
| H2O | 20 | |
| NH$_4$OH | 2 | |
| H$_2$0 | 10 | |
| oxazoline #1 | 2.4-24 | Increase Temperature back to 75° C. and post-add S4 to Resin |

Comparative Examples 4, 6 & 9

Same as Comparative Example 1 (control). Repeated for testing purposes.

Examples 5, 7 & 10

Same as Example 3. Repeated for testing purposes.

Example 8

Similar polymer composition as Example 3; while oxazoline #1 (2-5%) was post added to resin at 75° C. PROCESS II.

| Ingredient | Weight (g) | Procedure |
|---|---|---|
| Reactor Seeding | | |
| H$_2$O | 507 | Under N$_2$ purge, add water and |
| NaHCO$_3$ | 1 | Surfactant 1 (S1) and buffer agent |
| S1 | 2 | (NaHCO$_3$) to reactor, increase temperature to 75° C. |
| Monomer Emulsion (ME) | | |
| H2O | 415 | Pre-prepare Monomer Emulsion (ME) |
| S1 | 14 | Add 5% (wt.) of ME to reactor |
| S2 | 46 | Charge seed and initiator solution I to |
| WAM | 26 | reactor and hold for 15 minutes |
| MAA | 13 | Feed the remaining monomer emulsion |
| MMA | 593 | and Initiator Solution II simultaneously |
| BA | 522 | over a period of 3.5 hours |
| NH$_4$OH | 6 | |
| | | After monomer feed, hold reactor at 75° C. for 1 hour |
| | | Cool the reactor to 60° C. |
| | | Feed oxidizing and reducing agent solution simultaneously over 30 min. |
| | | Cool to RT, neutralize using NH$_4$OH solution. |

| Ingredient | Weight (g) | Procedure |
|---|---|---|
| Initiator solution I | | |
| H₂O | 15 | |
| Na₂S₃O₈ | 2 | |
| Initiator solution II | | |
| Na₂S₃O₈ | 1 | |
| H₂O | 20 | |
| H₂O (rinse) | 30 | |
| Oxidizing agent Solution | | |
| TBH | 2 | |
| H2O | 20 | |
| Reducing agent solution | | |
| FF6M | 2 | |
| H2O | 20 | |
| NH₄OH | 2 | |
| H₂0 | 10 | |
| oxazoline #1 | 24-62 | Increase Temperature back to 75° C. and post-add S4 to Resin |
| Total grams | 2312 | |

Example 11

Same as Example 8. Repeated for testing purposes.

Example 12

Similar polymer composition as Example 3, while oxazoline #1 (5-8%) was post added to resin at 75° C. PROCESS II.

| Ingredient | Weight (g) | Procedure |
|---|---|---|
| Reactor Seeding | | |
| H₂O | 507 | Under N₂ purge, add water and |
| NaHCO₃ | 1 | Surfactant 1 (S1) and buffer agent |
| S1 | 2 | (NaHCO₃) to reactor, increase temperature to 75° C. |
| Monomer Emulsion (ME) | | |
| H2O | 415 | Pre-prepare Monomer Emulsion (ME) |
| S1 | 14 | Add 5% (wt) of ME to reactor |
| S2 | 46 | Charge seed and Initiator solution I to |
| WAM | 26 | reactor and hold for 15 minutes |
| MAA | 13 | Feed the remaining monomer emulsion |
| MMA | 593 | and Initiator Solution II simultaneously |
| BA | 522 | over a period of 3.5 hours |
| NH₄OH | 6 | |
| | | After monomer feed, hold reactor at 75° C. for 1 hour |
| | | Cool the reactor to 60° C. |
| | | Feed oxidizing and reducing agent solution simultaneously over 30 min. |
| | | Cool to RT, neutralize using NH₄OH solution. |
| Initiator solution I | | |
| H₂O | 15 | |
| Na₂S₃O₈ | 2 | |
| Initiator solution II | | |
| Na₂S₃O₈ | 1 | |
| H₂O | 20 | |
| H₂O (rinse) | 30 | |
| Oxidizing agent Solution | | |
| TBH | 2 | |
| H2O | 20 | |
| Reducing agent solution | | |
| FF6M | 2 | |
| H2O | 20 | |
| NH₄OH | 2 | |
| H₂0 | 10 | |
| oxazoline #1 | 62-102 | Increase Temperature back to 75° C. and post add S4 to Resin |
| Total grams | 2312 | |

Example 13

Similar polymer composition as Example 2; oxazoline #2 (0.2-2%) added towards the last part of feed (20-25%). PROCESS II.

| Ingredient | Weight (g) | Procedure |
|---|---|---|
| Reactor Seeding | | |
| H₂O | 507 | Under N₂ purge, add water and |
| NaHCO₃ | 1 | Surfactant 1 (S1) and buffer agent |
| S1 | 2 | (NaHCO₃) to reactor, increase temperature to 75° C. |
| Monomer Emulsion (ME) | | |
| H2O | 415 | Pre-prepare Monomer Emulsion (ME) |
| S1 | 14 | Add 5% (wt) of ME to reactor |
| S2 | 46 | Charge seed and Initiator solution I to |
| WAM | 26 | reactor and hold for 15 minutes |
| MAA | 13 | Feed the remaining monomer emulsion |
| MMA | 593 | and Initiator Solution II simultaneously |
| BA | 522 | over a period of 3.5 hours |
| NH₄OH | 6 | Add S5 to last 20-25% of ME feed; Continue feed of monomers. |
| Shell ME | | After monomer feed, hold reactor at 75° C. for 1 hour |
| | | Cool the reactor to 60° C. |
| oxazoline #2 | 2.4-24 | Feed oxidizing and reducing agent solution simultaneously over 30 min. |
| | | Cool to RT, neutralize using NH₄OH solution. |
| Initiator solution I | | |
| H₂O | 15 | |
| Na₂S₃O₈ | 2 | |
| Initiator solution II | | |
| Na₂S₃O₈ | 1 | |
| H₂O | 20 | |
| H₂O (rinse) | 30 | |
| Oxidizing agent Solution | | |
| TBH | 2 | |
| H2O | 20 | |
| Reducing agent solution | | |
| FF6M | 2 | |
| H2O | 20 | |

-continued

| Ingredient | Weight (g) | Procedure |
|---|---|---|
| NH₄OH | 2 | |
| H₂0 | 10 | |
| Total grams | 2312 | |

Example 14

Similar polymer composition as Example 2; oxazoline #3 (0.2-2%) added towards the last part of feed (20-25%). PROCESS II.

| Ingredient | Weight (g) | Procedure |
|---|---|---|
| Reactor Seeding | | |
| H₂O | 507 | Under N₂ purge, add water and |
| NaHCO₃ | 1 | Surfactant 1 (S1) and buffer agent |
| S1 | 2 | (NaHCO₃) to reactor, increase temperature to 75° C. |
| Monomer Emulsion (ME) | | |
| H2O | 415 | Pre-prepare Monomer Emulsion (ME) |
| S1 | 14 | Add 5% (wt) of ME to reactor |
| S2 | 46 | Charge seed and Initiator solution I to |
| WAM | 26 | reactor and hold for 15 minutes |
| MAA | 13 | Feed the remaining monomer emulsion |
| MMA | 593 | and Initiator Solution II simultaneously |
| BA | 522 | over a period of 3.5 hours |
| NH₄OH | 6 | Add S6 to last 20-25% of ME feed; Continue feed of monomers. |
| Shell ME | | After monomer feed, hold reactor at 75° C. for 1 hour Cool the reactor to 60° C. |
| oxazoline #3 | 2.4-24 | Feed oxidizing and reducing agent solution simultaneously over 30 min. Cool to RT, neutralize using NH₄OH solution. |
| Initiator solution I | | |
| H₂O | 15 | |
| Na₂S₃O₈ | 2 | |
| Initiator solution II | | |
| Na₂S₃O₈ | 1 | |
| H₂O | 20 | |
| H₂O (rinse) | 30 | |
| Oxidizing agent Solution | | |
| TBH | 2 | |
| H2O | 20 | |
| Reducing agent solution | | |
| FF6M | 2 | |
| H2O | 20 | |
| NH₄OH | 2 | |
| H₂0 | 10 | |

As used herein, MFFT is the minimum temperature at which the latex will form a continuous film. MFFT was determined on a MFFT Bar-90 from Rhopoint Instruments according to ASTM D2354-98 and ISO 2115:1996) (American Standard Test Method for Minimum Film Formation Temperature). The emulsions were applied using a 75 micron cube applicator to form tracks. Emulsions were allowed to dry for 15-30 minutes depending on the temperature settings, which were chosen based on the calculated Tg of the latex. The MFFT were determined as points on tracks where the film has coalesced over 90% of the track width (no cracking).

Block resistance, or the propensity of a coating to adhere to itself instead of to its substrate, was measured according to a modified version of ASTM D4946 or Master Paint Institute (MPI)'s COR-MTD-063 standard. The blocking test measures how much of the paint film is transferred when two painted substrates are pressed together and then pulled apart.

Tackiness is the short-term stickiness that fades over time and is defined as the ability to form a connection of measurable strength to a substrate under pressure after a short contact time. The description of tackiness is described above. Tackiness of a painted surface is also discussed in T. Bell et al., "Quantification of Surface Tack of Next-Generation, High-Gloss, Low-VOC Architectural Binders," published in the PCIMag. (Feb. 1, 2017), and available at https://www.pcimag.com/articles/103025-quantification-of-surface-tack.

The residual monomers were measured by a gas chromatography (GC) instrument equipped with a FID or a Mass detector. This method is the industry accepted standard procedure for testing residual monomers, and is known to those of ordinary skill in the art.

Scrub Test. The scrub resistance is determined by ASTM Method D2846 or MPI's COR-MTD-116. Generally, a 7 mil drawdown of paint(s) is prepared on a scrub panel and allowed to air dry at room temperature for one week. A medium bristle brush is soaked overnight in deionized water for conditioning prior to running the test. Two glass plates are placed in the tray of the Abrasion tester, and three brass shims are placed on the plates in such a way that each paint being tested would have a shim under it. The test panel with the dried paint is secured to the two glass plates on the Gardner Abrasion Tester. Ten grams of abrasive scrub medium are applied to the bristles of the brush and the brush is then placed in a brush holder which is secured to the cables of the Abrasion Tester. Five cc of deionized water is applied to the test panel, and the scrub cycles are started. Every 400 cycles another 10 g of abrasive medium is applied to the brush and another 5 cc of deionized water is applied to the panel. The test is continued until paint is removed in one continuous line across its own shim and the number of cycles required to reach this point is recorded.

The stain removal test conducted in these experiments corresponds to MPI's COR-MTD-119 standard. Higher values indicate that the stains were more difficult to remove from the paint film. Lower values are more preferred. The numbers reported are the sum of the changes in color readings (Delta E values in CIE2000 units) of a pre-stained paint film and post-stained-and-washed paint film after a number of different stains are applied to the paint film. The stains include hot regular coffee, red cooking wine, tomato ketchup, yellow mustard and graphite. The cleaning solution comprises 0.5% nonyl phenoxy ethanol, 0.25% trisodium phosphate (TSP) and 99.25% deionized water. The cleaning solution is applied by a 430 g sponge/holder for 500 cycles. The changes of color caused by each stain are added and reported for each Example. Alternatively, a less preferred and less stringent stain removal test, MPI COR-MTD-083, can also be used.

What is claimed is:

1. An aqueous latex composition comprising latex particles dispersed in an aqueous solution, wherein the latex particles are polymerized from at least one acrylic monomer and a 2-oxazoline compound is incorporated onto the latex particles by a chemical bond as a moiety on the latex particles, wherein the 2-oxazoline compound has the following structure:

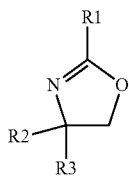

wherein R1 is a methyl, a cis-8-heptadecenyl, an ethyl or a phenyl ring, wherein R2 is a methyl, ethyl, hydroxymethyl or hydrogen, wherein R3 is a methyl, hydroxymethyl or hydrogen wherein the 2-oxazoline compound is present from about 1 wt. % to about 5 wt. % of the latex particles.

2. The aqueous latex composition of claim 1, wherein the 2-oxazoline compound is grafted to the latex particles.

3. An aqueous latex composition comprising latex particles dispersed in an aqueous solution, wherein the latex particles are polymerized from at least one acrylic monomer and an acid monomer, wherein a 2-oxazoline compound is incorporated onto the latex particles as a moiety on the latex particles, wherein the 2-oxazoline compound has the following structure:

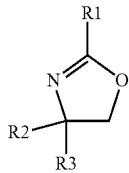

wherein R1 is free of an acyclic organic radical having addition polymerizable unsaturation, wherein R2 is a methyl, ethyl, hydroxymethyl or hydrogen, wherein R3 is a methyl, hydroxymethyl or hydrogen wherein the 2-oxazoline compound is present from about 1 wt. % to about 5 wt. % of the latex particles.

4. The aqueous latex composition of claim 1, wherein the latex particles are further polymerized with a methacrylic acid monomer.

5. The aqueous latex composition of claim 1, wherein the latex particles are further polymerized with an acid monomer.

6. The aqueous latex composition of claim 1, wherein the latex particles are further polymerized with a monocarboxylic or polycarboxylic acid monomer, containing from about 3 to about 8 carbon atoms.

7. The aqueous latex composition of claim 6, wherein said monocarboxylic or polycarboxylic acid monomer is selected from a group consisting of acrylic acid, methacrylic acid, ethacrylic acid, β, β-dimethylacrylic acid, crotonic acid, 2-pentenoic acid, 2-hexenoic acid, maleic acid, fumaric acid, citraconic acid, mesaconic acid, itaconic acid, 3-butene-1,2,3-tricarboxylic acid, and combination thereof.

8. The aqueous latex composition of claim 1, wherein the at least one acrylic monomer comprises at least one of a butyl acrylate monomer, a methyl methacrylate monomer or a 2-ethylhexyl acrylate monomer.

9. The aqueous latex composition of claim 1, wherein R1 is a methyl.

10. The aqueous latex composition of claim 1, wherein R1 is a cis-8-heptadecenyl.

11. The aqueous latex composition of claim 1, wherein R1 is an ethyl.

12. The aqueous latex composition of claim 1, wherein R1 is a phenyl ring.

13. The aqueous latex composition of claim 9, wherein R1=R2=R3.

14. The aqueous latex composition of claim 13, wherein the 2-oxazoline compound comprises 2,4,4-trimethyl-2-oxazoline.

15. The aqueous latex composition of claim 10, wherein R2 is an ethyl and R3 is a hydroxymethyl and R1 is not an acyclic organic radical having addition polymerizable unsaturation.

16. The aqueous latex composition of claim 15, wherein the 2-oxazoline is 4-ethyl-2-(8-heptadecenyl)-2-oxazoline-4-methanol.

17. The aqueous latex composition of claim 10, wherein each of R2 and R3 is a hydroxymethyl and R1 is not an acyclic organic radical having addition polymerizable unsaturation.

18. The aqueous latex composition of claim 17, wherein the 2-oxazoline is 2-(heptadecenyl)-2-oxazoline-4,4-dimethanol.

19. The aqueous latex composition of claim 11, wherein each of R2 and R3 is a hydrogen and R1 is not an acyclic organic radical having addition polymerizable unsaturation.

20. The aqueous latex composition of claim 11, wherein the 2-oxazoline is 2-ethyl-2-oxazoline.

21. The aqueous latex composition of claim 12, wherein each of R2 and R3 is a methyl.

22. The aqueous latex composition of claim 20, wherein the 2-oxazoline is 4,4-dimethyl-2-phenyl-2-oxazoline.

23. The aqueous latex composition of claim 1, further comprising other latex particles, wherein the other latex particles are co-polymerized from a 2-oxazoline compound and at least one acrylic monomer wherein R1 of the 2-oxazoline compound is an acyclic organic radical having addition polymerizable unsaturation.

24. A paint or stain composition comprising the aqueous latex composition of claim 1.

25. The aqueous latex composition of claim 1, wherein the aqueous latex composition is free of coalescent aid.

* * * * *

UNITED STATES PATENT AND TRADEMARK OFFICE
CERTIFICATE OF CORRECTION

| | |
|---|---|
| PATENT NO. | : 11,639,406 B2 |
| APPLICATION NO. | : 17/052628 |
| DATED | : May 2, 2023 |
| INVENTOR(S) | : Rogina Saad et al. |

It is certified that error appears in the above-identified patent and that said Letters Patent is hereby corrected as shown below:

In the Claims

Claim 22 should be listed as shown:
22. The aqueous latex composition of claim 21, wherein the 2-oxazoline is 4,4-dimethyl-2-phenyl-2-oxazoline.

Signed and Sealed this
Twenty-ninth Day of October, 2024

Katherine Kelly Vidal
*Director of the United States Patent and Trademark Office*